United States Patent [19]

Ito et al.

[11] Patent Number: 4,630,153

[45] Date of Patent: Dec. 16, 1986

[54] MAGNETIC TAPE DEVICE

[75] Inventors: Yukio Ito; Kazuki Takai; Satoshi Takagi, all of Tokyo, Japan

[73] Assignee: Clarion Co., Ltd., Tokyo, Japan

[21] Appl. No.: 695,166

[22] Filed: Jan. 25, 1985

Related U.S. Application Data

[63] Continuation of Ser. No. 394,281, Jul. 1, 1982, abandoned.

[51] Int. Cl.[4] .......................... G11B 5/54; G11B 21/22
[52] U.S. Cl. .................................................. 360/105
[58] Field of Search ................ 360/105, 93, 96.1, 96.2

[56]  References Cited

U.S. PATENT DOCUMENTS

| | | | |
|---|---|---|---|
| 4,224,647 | 9/1980 | Umezawa | 360/105 X |
| 4,390,918 | 6/1983 | Matsumoto | 360/105 X |
| 4,399,475 | 8/1983 | Shimomae | 360/105 X |
| 4,408,237 | 10/1983 | Takahashi | 360/105 X |
| 4,470,087 | 9/1984 | Sakamoto | 360/105 |

Primary Examiner—S. J. Heinz
Attorney, Agent, or Firm—Russell E. Hattis; Ralph E. Rath

[57] ABSTRACT

In a magnetic tape device including a cam, an operating member driven by the cam against force of an energizing member to bring a head to a position for press-fitting a tape, and a changeover member actuated by the cam for changing tape feeding direction, an improvement which comprises an electromagnetic plunger, a control member for linking the cam and the operating member to actuate the operating member in press-fitting position upon energization of the electromagnetic plunger and for releasing transmitting relation between the cam and the operating member both in the press-fitting state and in the middle of the press-fitting action upon deenergization of the electromagnetic plunger, and a link member for linking the cam and the changeover member during action of the operating member, thus not cancelling transmitting relation between the cam and the changeover member even if the action of the operating member is cancelled during action of the changeover member.

1 Claim, 18 Drawing Figures

MAGNETIC TAPE DEVICE

REFERENCE TO RELATED APPLICATION

This application is a continuation of application Ser. No. 394,281, filed July 1, 1982, now abandoned.

DESCRIPTION

Technical Field

The present invention relates generally to magnetic tape devices and, more particularly, to a mechanism for controlling the movement of the tape head.

BACKGROUND OF THE INVENTION

This invention relates to a magnetic tape device.

Conventionally, press-fitting action of a head and tape feeding direction changeover action have been performed by commonly use a cam driven by a motor. Namely, an operating member for achieving press-fitting action of the head is directly linked to the cam to thereby directly receive the driving force of the cam, and at the same time, a changeover member for achiving tape feeding direction changeover action is operable only when the operating member is at the position to press-fit the head.

Such prior-art mechanism, however, had such drawbacks that the head stops in an insecure position on way of shifting if the power source is interrupted to cause the motor to stop on way of press-fitting action of the head by the cam and that if a user wants to do stop operation, fast-forwarding operation, rewinding operation or eject operation, he has to wait until the action for press-fitting the head is completed because forcible operations often damage the heads. Further, if the action of the operating member is cancelled in the middle of the action of the changeover member, the changeover member is left pendent in an undesired position in the middle of changing action of the changeover means. This makes it impossible to perfectly change the tape feeding direction and also drive the tape even in the former direction after this.

OBJECT OF THE INVENTION

It is therefore an object of the present invention to overcome the above-metnioned drawbacks in the priorart by providing a head shift mechanism in a magnetic tape device capable of cancelling transmission between an operating member for shifting a head and a cam even during head shifting action and so arranged not to cancell action of the change-over member during its action for changing tape feeding direction even if action of the operating member is cancelled.

SUMMARY OF THE INVENTION

In accordance with the present invention, there is provided magnetic tape device which comprises:
 a power member supplied with power;
 an engaging member intermittently engageable with said power member;
 a cam member movable simultaneously with said engaging member;
 a changeover member to be driven by said cam member;
 a select means for having said changeover member start moving in response to said cam member or stop moving;
 an operating member movably mounted and holding a magnetic head thereon;
 a control member located between said changeover member and said operating member for having said operating member shift in response to movement of said changeover member;
 a lock member for locking said control member when said magnetic head reaches the position for suppressing a tape due to movement of said operating member and holding the operating member there;
 a release means for releasing said control member from the lock by said lock member;
 a changeover cam for changing tape feeding direction;
 a link member having a support point engageable with a lock portion formed in said changeover memeber for shifting with to-and-fro movement due to action of said changeover member when said support point is locked in said lock portion to thereby change over said changeover cam.

BRIEF DESCRIPTION OF THE DRAWINGS

The drawings illustrate an embodiment according to the present invention, in which:

FIGS. 1a to 6a are plans showing action of portions related to head press-fitting action;

FIGS. 1b to 6b are plans showing portions related to tape feeding direction changeover action;

DETAILED DESCRIPTION OF THE PREFERRED EMBODIMENT

The present invention will now be described in detail referring to the preferred embodiment illustrated in the drawings.

The drawings show an embodiment so arranged to perform action for press-fitting a head in addition to tape feeding direction changeover action. In the description hereunder, words like "up", "down", "right", "left", etc. mean directions in the drawings.

Figure 1A:
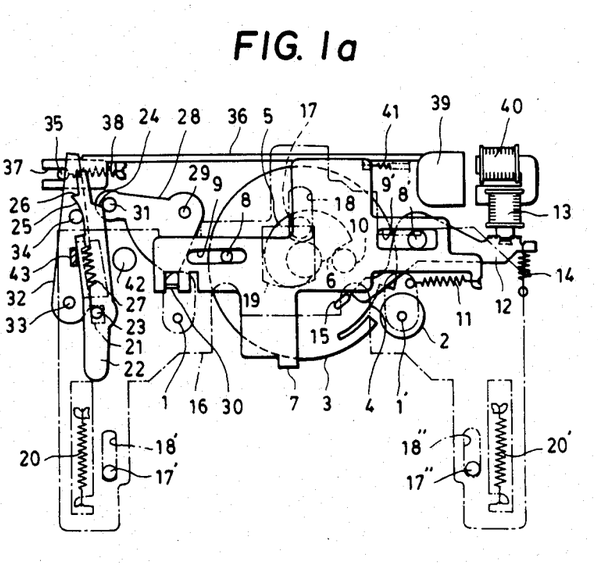

First of all, description will be made as to members related to press-fitting action of the head referring to FIGS. 1a to 6a. Reference numerals 1 and 1' refer to capstans each mounted on a fixture frame not shown, 2 to a gear coaxially mounted with the capstan 1' for integral rotation with a motor not shown, 3 to an intermittent gear mounted on the fixture frame with the teeth portion thereof other than a cut-off portion 4 being in meshing engagement with the gear 2, 5 to a cam integrally formed on the intermittent gear 3 having a step portion 6 at the termination thereof. Reference numeral 7 designates a changeover member having elongated holes 9 and 9' which are in engagement with guide pins 8 and 8' provided on the fixture frame, permitting the changeover member to move in right and left direction. Numeral 10 refers to a roller (or a pin) provided on the changeover member 7 for engagement with the cam 5, 11 to a spring leftwardly energizing the changeover member 7. Tensile force of the spring 11 causes the roller 10 to get in contact with the cam 5. As shown in FIG. 1a, when the intermittent gear 3 is so positioned to be out of engagement with the gear 2, the roller 10 is in contact with the step portion 6 of the cam 5, so that the force of the roller 10, which is going to move leftward, energizes the intermittent gear to rotate in anti-clockwise direction toward a position for engaging with the gear 2. Against this force, a stopper member 12 keeps the intermittent gear 3 staying at the position as shown in FIG. 1a. The stopper member 12 is pivotally supported by the guide pin 8' and is positioned as shown in FIG. 1a due to tensile force of a spring 14 while a release plunger 13 mounted on the fixture frame is deenergized to engage with a protuberance 15 formed on the intermittent gear 3 to thereby make the intermittent gear 3 stay there.

Figure 2A:
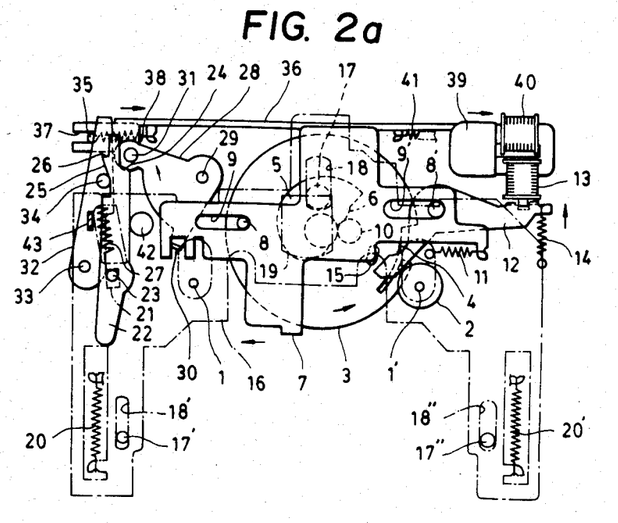

Reference numeral 16 denotes an operating member having a stroke limit hole 18 and elongated holes 18' and 18" which are in engagement with guide pins 17, 17' and 17", respectively so that the operating member 16 may move in up and down direction up to the limited stroke. Numeral 19 refers to a magnetic head mounted on the operating member 16, and, 20 and 20' to springs for upwardly energizing the operating member 16. When the lowermost end of the stroke limit hole 18 is in contact with the guide pin 17, the head 19 is in released condition. Numeral 21 refers to a slightly longitudinally elongated hole formed in the operating member and 22 to a control member pivotally supported with its supported point 23 being inserted in the hole 21 for up and down movement. The control member 23 has a slanting surface 24 formed at the upper and right side thereof and a downwardly slanting surface 25 as well as an upwardly slanting surface 26 both formed at the upper and left side thereof. Numeral 27 designates a spring for upwardly energizing the supported point 23 of the control member 22 toward the operating member 16. The spring force of the spring 27 is larger than those of the springs 20 and 20', so that when the control member 22 is in an upper position as shown in FIGS. 1a and 2a, of course, and also when it is pushed downward as shown in FIG. 3a, the supported point 23 is kept contacting with the uppermost end of the hole 21 until the uppermost end of the stroke limit hole 18 gets in contact with the guide pin 18 not to let the operating member 16 shift downwardly any more.

Figure 5A:
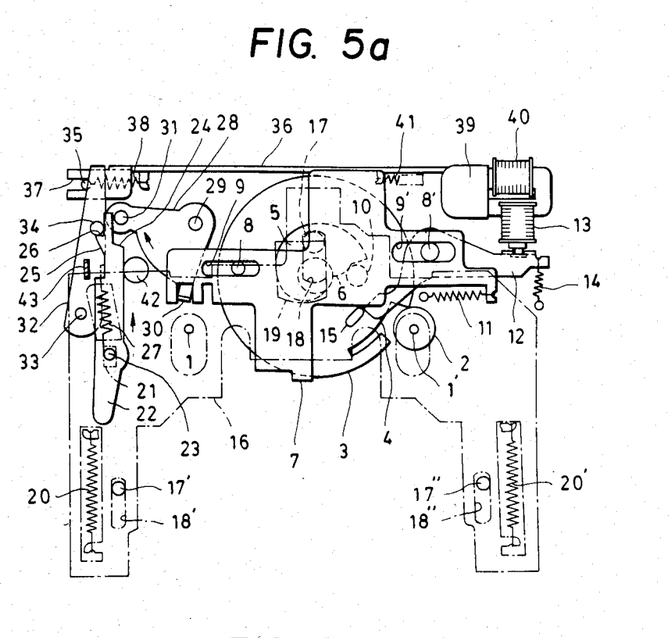

Numeral 28 is a sector member pivotally supported on the fixture frame. The sector member 28 has an engage portion 30 being in engagement with a slit at the left end the changeover member 7 so that, in response to right and left movement of the engage portion 30 due to movement of the changeover means 7, a protuberance 31 formed on the sector member 28 and being in engagement with the slanting surface 24 of the control member 22 moves upward and downward. Numeral 32 is a lock member pivotally supported with its supported point 33 on the fixture frame. The lock member 32 has protuberance 34 for engaging with the slanting surfaces 25 and 26 as well as an engage portion 35 formed at the upper portion thereof. Numeral 36 refers to a holding member, 37 to a hole formed at the leftmost end of the holding member 36 for engagement with the engage portion 35 of the lock member 32, 38 to a spring for energizing the engage portion 35 toward the right and lower end of the hole 37 rightwardly with respect to the holding member 36, 39 to a movable core provided at the rightmost end of the holding member 36 for being in cooperation with a holding plunger 40 mounted on the fixture frame, and, 41 to a spring for rightwardly energizing the holding member 36 so as to call the movable core 39 in the holding plunger 40. Spring force of the spring 38 is larger than that of the spring 41, so that when the movable core 39 is attracted by the holding plunger 40 as shown in FIG. 5a and the protuberance 34 of the lock member 32 is in contact with the upward slanting surface 26 of the control member 22 to prevent upward movement of the control member 22, the spring force of the spring 38 holds the locked condition, while when the holding plunger 40 is deenergized, the lock member 32 rotates in the anti-clockwise direction against the spring 41 to thereby release the locked condition as shown in FIG. 6a.

Figure 3A:
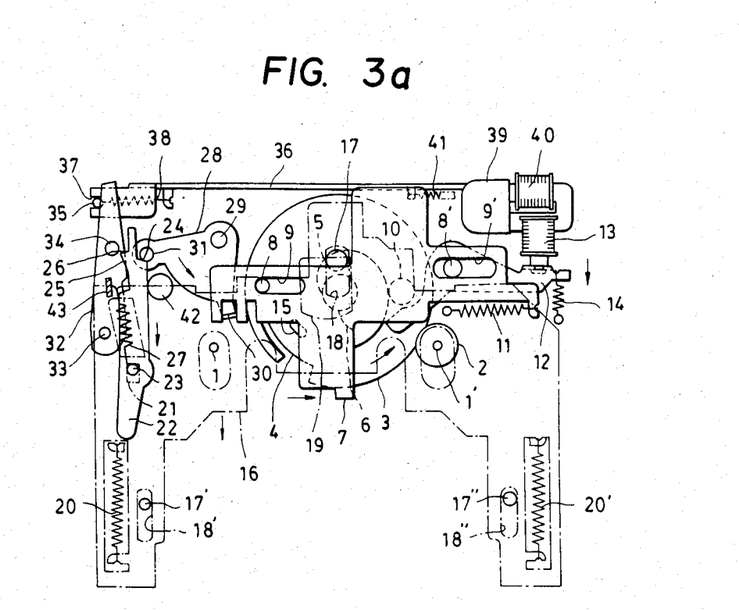
Figure 3B:
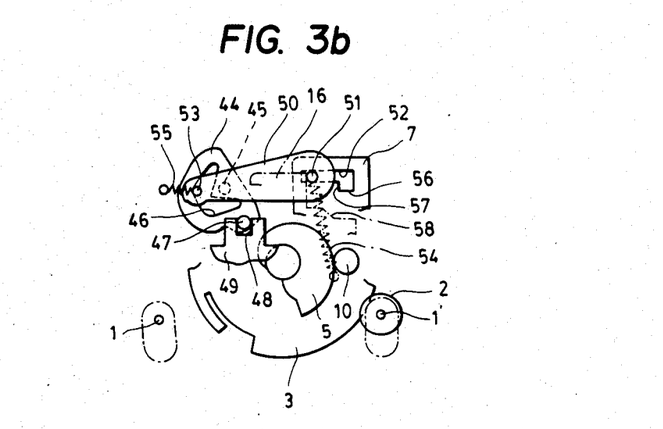
Figure 6A:
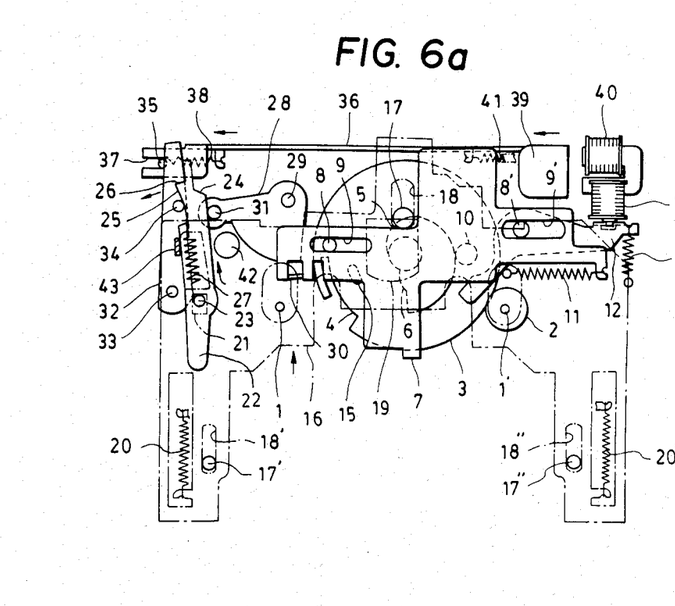

Numeral 42 refers to a stopped provided on the fixture frame for restricting clockwise rotation of the control member 22 and 43 to a limit plate also provided on the fixture frame for limiting anti-clockwise rotation of the control member 22 in order to prevent it from rotating in anti-clockwise direction following to the lock member 32 even after the slanting surface 24 of the control member 22 gets out of the protuberance 31 of the sector member 28 while the control member 22 moves from the position shown in FIG. 3a to the position shown in FIG. 6a which may make it difficult for the upward slanting surface 26 to get out of the protuberance 34 of the lock member 32.

Figure 1B:
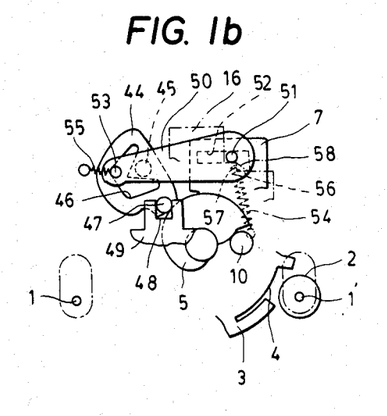
Figure 2B:
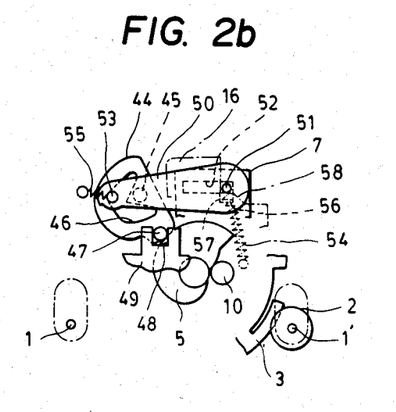

Next, description will be made as to members related to action for changing tape feeding direction referring to FIGS. 1b to 6b as well as FIGS. 7 to 12. Reference numeral 44 refers to a changeover cam pivotally supported onto the fixture frame and having a V-like cam hole 46 extending substantially at both sides of a support point 45 thereof and a protuberance 47 at the lowermost end thereof, when the changeover cam 44 pivots about the support point 45 thereof, the protuberance 47 moves to the right and left to move a channel changeover plate 49 partially shown through a concave 48 in engagement therewith, thus changing tape feeding direction and channel. Reference numeral 50 designates a link member with a support point 51 movably received in and pivotally supported by a hole 52 formed in the changeover member 7. The link member 50 has an acting pin 53 at the left end thereof which is in engagement with the cam hole 46. Numeral 54 refers to a spring for downwardly pulling the support point 51, and 55 to a spring for leftwardly pulling the acting pin 53. The hole 52 is substantially in a J-like configuration having a fall-down portion 56 at the right and lowermost end thereof. The fall-down portion 56 is so formed that the support point 51 becomes as high as the support point 45 when the former falls therein as shown in FIGS. 7 to 11 while the left portion of the hole 52 keeps the support point 51 up. Numeral 58 is a step portion to the hole 52. The step portion 58 has an upper horizontal edge so formed to become substantially in alignment with the lower edge of the hole 52 when the operating member 16 is at the highest position (at the position for releasing the head 19) as shown in FIGS. 1b and 2b, and a slanting edge slanting from the right end of the upper horizontal edge to the rightmost end of the operating member 16 until the substantially same level as the bottom of the fall-down portion 56.

The device constructed as above functions as follows. First, as to press-fitting action of the head, the device is in the state as shown in FIG. 1a while it stands still. At this time, the support point 51 of the link member 50 is located at the left with respect to the fall-down portion 56 of the hole 52.

When a cassette, for example, is inserted from this state, the release plunger 13 is energized to cause the stopper member 12 to rotate in anti-clockwise direction to thereby get out of the protuberance 15. Then, the roller 10 pushes the step portion 6 due to tensile force of the spring 11 and moves to the left, rotating the cam 5 to anti-clockwise direction. Due to rotation of the cam 5, the intermittent gear 3 which is integral with the cam 5 rotates in the same direction to get in meshing contact with the gear 2 which is made to rotate in clockwise direction by the motor. On the other hand, due to leftward movement of the changeover member 7 following to leftward movement of the roller 10, the protuberance 31 of the sector member 28 moves upward to thereby get out of the right lateral surface of the control member 22 upward of the slanting surface 24, so that the control member can rotate in clockwise direction. Thus, the control member 22, lock member 32 and holding member 36 move in clockwise direction and to the right due to tensile force of the spring 41 to cause the movable core 39 to be called in and attracted and held by the holding plunger 40 (ref.: FIG. 2a). At this time, although the support point 51 of the link member 50 reaches just above the fall-down portion 56, it does not fall in the same because it is riding on the step portion 58 of the operating member (ref.: FIG. 2).

Figure 4A:
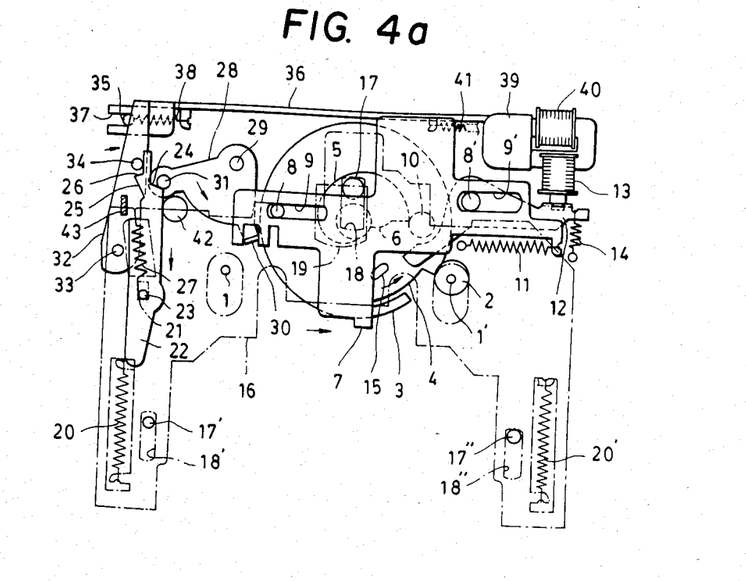
Figure 4B:
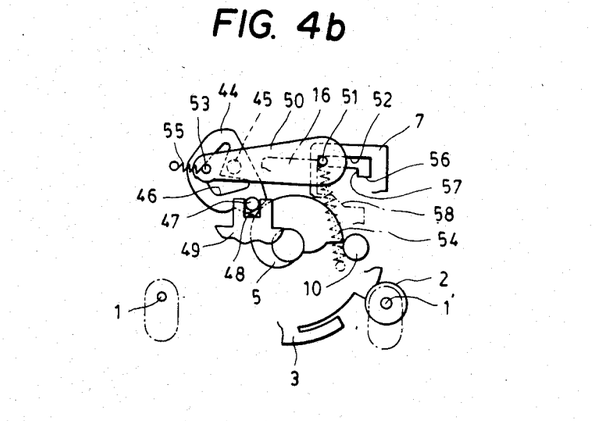

The intermittent gear 3 which is in meshing engagement with the gear 2 sequentially rotates in the same direction so that the cam 5 pushes the roller 10 to make the changeover means 7 move to the right. Accordingly the protuberance 31 of the sector member 28 moves downward to thereby push the control member 22 to below the slanting surface 24. When the control member 22 is pushed downward, the operating member 16 is pushed downward integrally with the control member 22 until the uppermost end of the stroke limit hole 18 gets in contact with the guide pin 17 while the lock member 32 rotates in anti-clockwise direction against tensile force of the spring 38 because the protuberance 34 thereof is pushed by the downward slanting surface 25 of the control member 22 (ref.: FIG. 3a). At this time, the support point 51 of the link member 50 is located at the left with respect to the fall-down portion 56 (ref. FIG. 4a).

Even after the operating member 16 reaches the lowermost end (namely, the position where the head 19 is press-fit), the control member 22 is still continuously pushed downward until the roller 10 reaches the highest position of the cam 5. At that time, the supported point 23 moves downward within the hole 21 against tensile force of the spring 27 while the lock member 32 rotates in clockwise direction due to tensile force of the spring 38 because the protuberance 34 thereof gets out of the downward slanting surface 25 (ref.: FIG. 4a). At this time, the support point 51 of the link member 50 is lcoated at substantially leftmost end of the hole 52 (ref.: FIG. 4a).

Figure 5B:
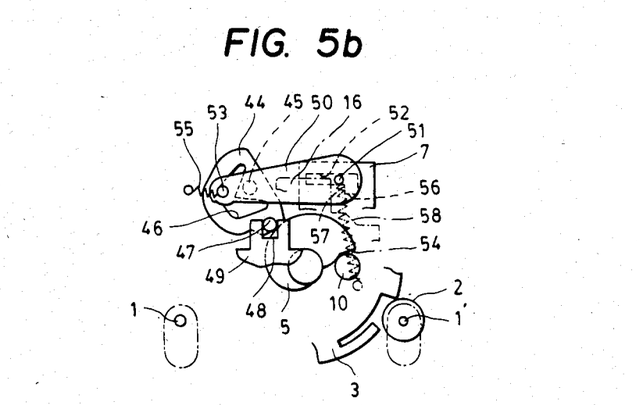

When the roller 10 passes over the highest position of the cam 5, the intermittent gear 3, when reaching such a position that the cut-off portion 4 thereof faces to the gear 2, gets out of meshing engagement and the stopper member 12, which has returned to the stop position due to tensile force of the spring 14 because the release plunger has been deenergized, engages with the protuberance 15 to hold the intermittent gear 3 there. On the other hand, the changeover member 7 moves to the left due to tensile force of the spring 11 until the roller 10 gets in contact with the step portion 6 causing the protuberance 31 of the sector member 28 to move upward. The control member 22 which has got free from downward pressure by the protuberance 31 moves upward due to tensile force of the spring 27 until the upward slanting surface 26 gets in contact with the protuberance 34 of the lock member 32. Such locked condition where the upward slanting surface 26 is in contact with the protuberance 34 is held by holding force of the holding plunger 40 and tensile force of the spring 38. In this locked condition, the protuberance 23 of the control member 22 is locked slightly apart from the uppermost end of the hole 21, so that tensile force of the spring 27 effectively acts on the operating member 16 to surely hold it at the lowermost position (namely, the position where the head 19 is press-fit) (ref.: FIG. 5a). This locked condition is thereafter held throughout play time of the cassette tape. At this time, the support point 51 of the link member 50 is at substantially same position as FIG. 1b (ref.: FIG. 5b).

Figure 6B:
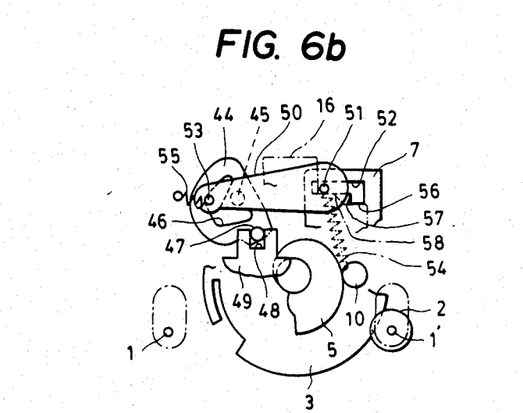

In the process from FIG. 2a to FIG. 5a and in the locked condition of FIG. 5a, if a user wants to do an operation causing action for releasing the head, he may only deenergize the holding plunger 40. Then, the holding member 36 and the lock member 32 lose holding power of the holding plunger 40, so that tensile force of the springs 20 and 20' which upwardly energize the control member 22 through the operating member 16 overcomes tensile force of the spring 41 which energizes the control member 22 through the lock member 32 in clockwise direction. Accordingly, the control member 22, rotating in anti-clockwise direction in a manner avoiding the protuberance 31 of the sector member 28, gets out of the protuberance 31. At the same time, the upward slanting surface 26, so pushing the protuberance 34 of the lock member 32 leftwardly to rotate the lock member 32 in anti-clockwise direction, gets out of the protuberance 34 and further moves upward until the lowermost end of the stroke limit hole 18 gets in contact with the guide pin 17 (namely, until the head 19 is released) and stops there. If the holding plunger 40 is deenergized substantially in a state as shown in FIGS. 3a and 3b, the device changes to a state as shown in FIGS. 6a and 6b. And, if the motor continues rotating, the intermittent gear 3, after continuously rotating from the position as shown in FIG. 6a, stops at the position as shown in FIG. 1a.

In the process from FIG. 2a to FIG. 5a and in the locked condition as shown in FIG. 5a, also if power source is interrupted, the operating member 16 immediately returns to the position to release the head 19 because the holding plunger 40 is deenergized in response to the interruption.

Figure 7:
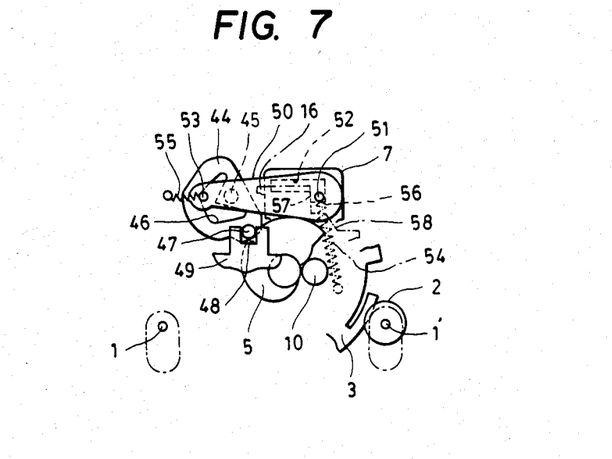
FIGS. 7 to 10 are plans showing tape feeding direction changeover action substantially corresponding to FIGS. 2b to 5b.

Next, action for changing tape feeding direction will now be described hereunder. In the tape play mode as shown in FIG. 5a, when the release plunger 13 is energized, the stopper member 12 gets out of the protuberance 15 and the cam 5 accordingly rotates to cause the intermittent gear 3 to get in engagement with the gear 2 in the same manner as in FIG. 2a. On the other hand, since the operating member 16 is at the lowermost position (at the position for press-fitting the head 19), the support point 51 of the link member 50, in accordance with the leftward movement of the changeover member 7, falls in the fall-down portion 56 due to tensile force of the spring 54 (ref.: FIG. 7).

Figure 8:
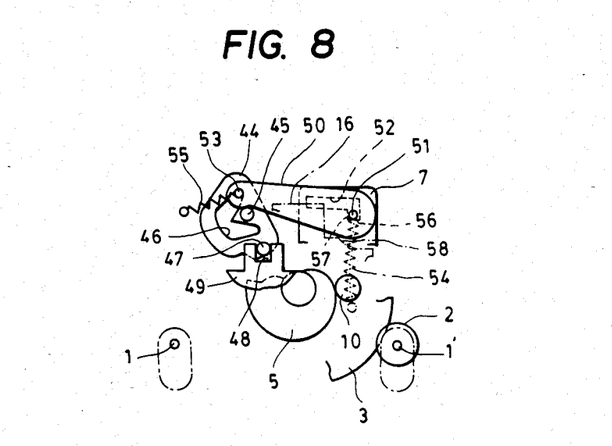
Figure 9:
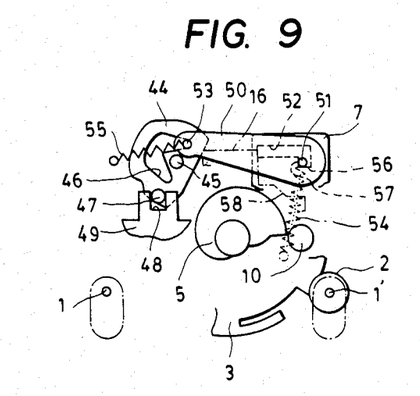

In accordance with rightward movement of the changover member 7 due to rotation of the intermittent gear 3 from that state, the link member 50, with its support point 51 being held by the lock portion 57 of the hole 52, is moved rightward against tensile force of the spring 55. Accordingly, the acting pin 53 enters in an upper portion of the cam hole 46 to pull the right end of the changeover cam 44 and rotate it to clockwise direction. Thereby the channel changeover plate 49 moves leftward through the protuberance 47 to change tape feeding direction and channel (ref.: FIGS. 8 and 9).

Figure 10:
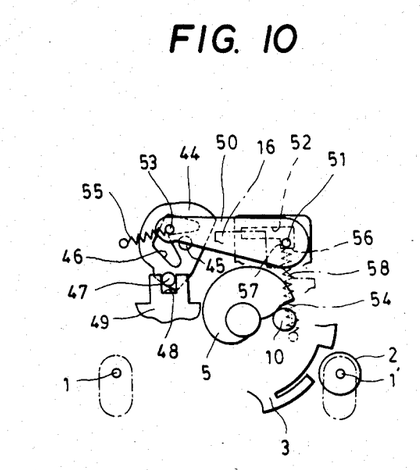

When the intermittent gear 3 finishes one rotation and the protuberance 15 engages with the stopper member 12, the link member 50 moves leftward together with the changeover member 7 whereby the acting pin 53 stops at the position corresponding to the leftmost end of the upper portion of the cam hole 46 (ref.: FIG. 10).

Figure 11:
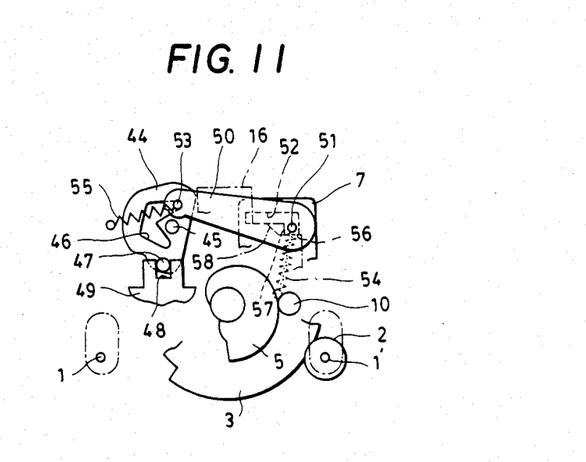
FIGS. 11 and 12 are plans showing the link member in a state where the operating member has restored.

In the process from FIG. 8 to FIG. 9, namely, during action of the changeover cam 44, even if the operating member 16 returns from the lowermost position to the uppermost position, the fall-down portion 56 is located in the right with respect to the slanting edge of the step portion 58 and the step portion does not enter in the fall-down portion 56 whereby the link member 50 is kept in the state with its support point locked by the lock portion 57 (ref.: FIG. 11).

Figure 12:
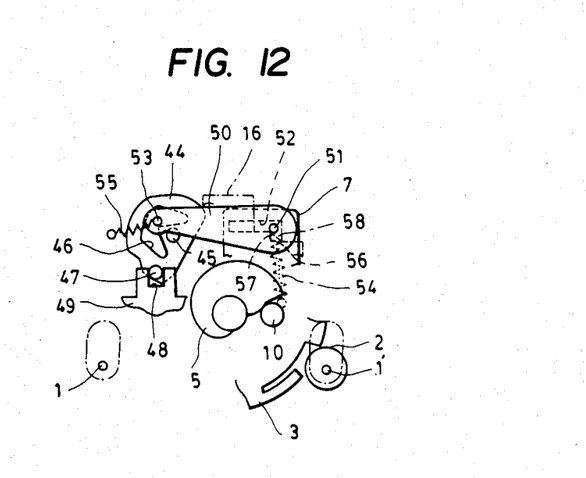

When the operating member 16 returns from the lowermost position to the uppermost position upon completion of action of the changeover cam 44, namely from the state as shown in FIG. 10, the step portion 58 is in a position to enter in the fall-down portion 56, where the step portion 58 raises the support point 51 and bring it out of the fall-down portion 56 (ref.: FIG. 12), so that the link member 50 returns to the position as shown in FIG. 5b.

When the release plunger 13 is energized, again, from the state as shown in FIG. 10, since the changeover cam 44 is in the state as shown in FIG. 10 instead of the state as shown in FIG. 5b, the acting pin 53 enters in the lower portion of the cam hole 56 to rotate the changeover cam 44 in anti-clockwise direction. Thereby, the channel change-over plate 49 moves rightward to change tape feeding direction to the contrary.

Although the control member 22 is pivotally mounted for up and down movement with respect to the operating member 16 in the above described emobdiment, it need not be movable upward nor downward. Both of the locked condition in the process from FIG. 2a to FIG. 5a and the locked condition in the state of FIG. 5a are maintained by the only one holding plunger 40 in the above-mentioned embodiment. However, independent two plungers may be provided. Further, although the device according to the embodiment in the above is arranged to perform action for press-fitting the head in addition to action for changing tape feeding direction, it is not limited to such structure. Beside these, the present invention may be put in various modification and alternation.

As described in the above, according to the present invention so constructed as above, the operating member for shifting and press-fitting the head can be brought out of transmitting relation with the cam even during its action for shifting and press-fitting the head. Owing to this, when power source is interrupted to stop the motor in the middle of the head shifting action of the operating member through the cam or when a user wants to do an operation in the middle of another kind of operation, the operating member can immediately return in its stable position by deenergizing the electromagnetic plunger.

Further, even when the action of the operating member is cancelled in the middle of the action of the changeover member for changing tape feeding direction, the changeover member can continue its action. Therefore, it is prevented that the changeover member stops at an instable position in the middle of changeover action and tape feeding direction can always be changed in a secure and complete manner.

We claim:

1. In a magnetic tape device including a cam (5), an operating member (16) driven by said cam to move a head (19) thereon to an operative position against a tape, and a changeover member (7) for linking said cam and said operating member, linkage means (22, 28, 32, 36) operatively connecting said changeover member to said operating member and moving said operating member in response to movement of said changeover member to an operative position, an electromagnetic plunger (40) cooperating with said linkage means for holding said operating member and said linkage means in an operative position with said head against said tape, spring means for moving said linkage means to a released position upon being released from said plunger, and biasing means (20) on said operating member for moving said operating member to an inoperative position when said linkage means is released from said electromagnetic plunger thereby moving said head thereon to an inoperative position.

* * * * *